United States Patent [19]
Ellis

[11] 4,085,043
[45] Apr. 18, 1978

[54] CARBON CONTACT COLUMN

[75] Inventor: Norbert H. Ellis, Warminster, Pa.

[73] Assignee: Met-Pro Systems, Inc., Lansdale, Pa.

[21] Appl. No.: 741,486

[22] Filed: Nov. 12, 1976

Related U.S. Application Data

[63] Continuation of Ser. No. 569,534, Apr. 18, 1975, abandoned.

[51] Int. Cl.² .............................................. C02C 5/02
[52] U.S. Cl. ..................................... 210/40; 210/189; 210/268
[58] Field of Search .................... 210/20, 33, 39, 189, 210/257 R, 268, 284, 322, 335, 40; 23/270 R

[56] References Cited
U.S. PATENT DOCUMENTS

| 3,244,621 | 4/1966 | Bouthilet | 210/39 |
| 3,298,950 | 1/1967 | Mindler | 210/33 |
| 3,396,847 | 8/1968 | Englesberg | 210/335 |
| 3,408,289 | 10/1968 | Gustafson | 210/39 |
| 3,436,344 | 4/1969 | Canning et al. | 210/39 |
| 3,515,277 | 6/1970 | Kingsbury et al. | 210/189 |

*Primary Examiner*—Charles N. Hart
*Assistant Examiner*—Ivars Cintins
*Attorney, Agent, or Firm*—Woodcock, Washburn, Kurtz & Mackiewicz

[57] ABSTRACT

In a carbon contact column for a system for removing certain organic compounds from waste water, carbon supplied to the column flows in counter-current contact with the stream of waste water flowing through the column. Carbon is removed from the bottom of the column by a jet eductor. A source of fluidizing water is connected to the column adjacent to the eductor to prevent the formation of a cavity in the carbon bed in that area adjacent to the jet eductor.

10 Claims, 4 Drawing Figures

CARBON CONTACT COLUMN

This is a continuation, of application Ser. No. 569,534, filed Apr. 18, 1975, now abandoned.

BACKGROUND OF THE INVENTION

This invention relates to a method of and apparatus for handling granular carbon which is used in an adsorption process removing certain soluble organic compounds from waste water streams.

More particularly, the invention relates to a carbon contact column used to remove soluble organics from domestic or institutional type sewage streams.

PRIOR ART

Activated carbon is utilized in sewage treatment plants to remove organic compounds having molecular weights in about the 4 to 20 carbon atoms range. There is an equilibrium or saturation point with respect to the amount of organic compounds that a mass of activated carbon may adsorb before regeneration or replacement of the activated carbon is necessary. Factors influencing the adsorption of water soluble organic compounds by activated carbon is dependent on the concentration of the contaminate in the waste water, on the time of contact of the contaminate with the carbon, on the porosity of the carbon, and on the number of times the carbon has been regenerated. It has been found that flowing waste water through a carbon column in countercurrent contact with the flowing carbon is a good technique for contaminate removal.

A bed of carbon forms at the bottom of the column. Carbon must be removed from this bed and piped to a carbon contact column upstream, or regenerated, or flushed to waste. The book *Process Design Manual For Carbon Adsorption,* U.S. Environmental Protection Agency Technology Transfer, October 1973, describes carbon contact columns. The chapter entitled "Carbon Transport" starting on page 3–40, discusses techniques for removing carbon from the columns. Most carbon contact columns have hopper bottoms which facilitate the removal of carbon from the bottom of the column.

Agitators and other devices have also been used to induce carbon movement. These carbon transport systems are suitable for use in large sewage treatment plants where the height of carbon columns is not a critical limitation. Large sewage treatment plants such as this generally have a static carbon bed type of arrangement with back washing and very tall adsorption columns.

Relatively small integrated, prefabricated sewage treatment plants have recently come into use. These are often referred to as "package" systems. They are generally assembled on a skid at the factory and are transported to the site by rail, truck or other transportation. In these integrated systems the height of the column is a critical limitation. This rules out the use of hopper bottoms on the carbon contact columns because with a hopper bottom the column must be very much taller to obtain the same effectiveness.

Special techniques are required to cause carbon to flow in a column if the column does not have a hopper bottom, agitator or vibrating mechanisms.

One reason that special techniques must be used to induce carbon flow is that as carbon is removed from the carbon bed, a cavity is produced which is void of anything but water and fines. Because of this cavity, a desired ration of carbon to water flowing out of the carbon outlet port cannot be obtained.

SUMMARY OF THE INVENTION

In accordance with this invention a carbon contact column has a source of fluidizing water connected to the column at a point adjacent to the means for removing the carbon to prevent the formation of a cavity in the carbon bed.

It is an object of the present invention to provide a carbon contact column for removing organic compounds from domestic and institutional waste water in a fully integrated system which may be assembled and transported with ease.

It is another object of this invention to provide a carbon contact column where the untreated waste water and the activated carbon are in counter-current flow, one to the other.

It is another object of this invention to provide a carbon contact column using a flat bottom tank of relatively short heighth in a system where the untreated waste water and the carbon are in counter-current flow.

The foregoing and other objects, features and advantages of the invention will be better understood from the drawings and the following description and appended claims.

DESCRIPTION OF THE DRAWINGS

FIG. 3 shows the jet eductor.

DESCRIPTION OF THE PREFERRED EMBODIMENT

Figure 1:
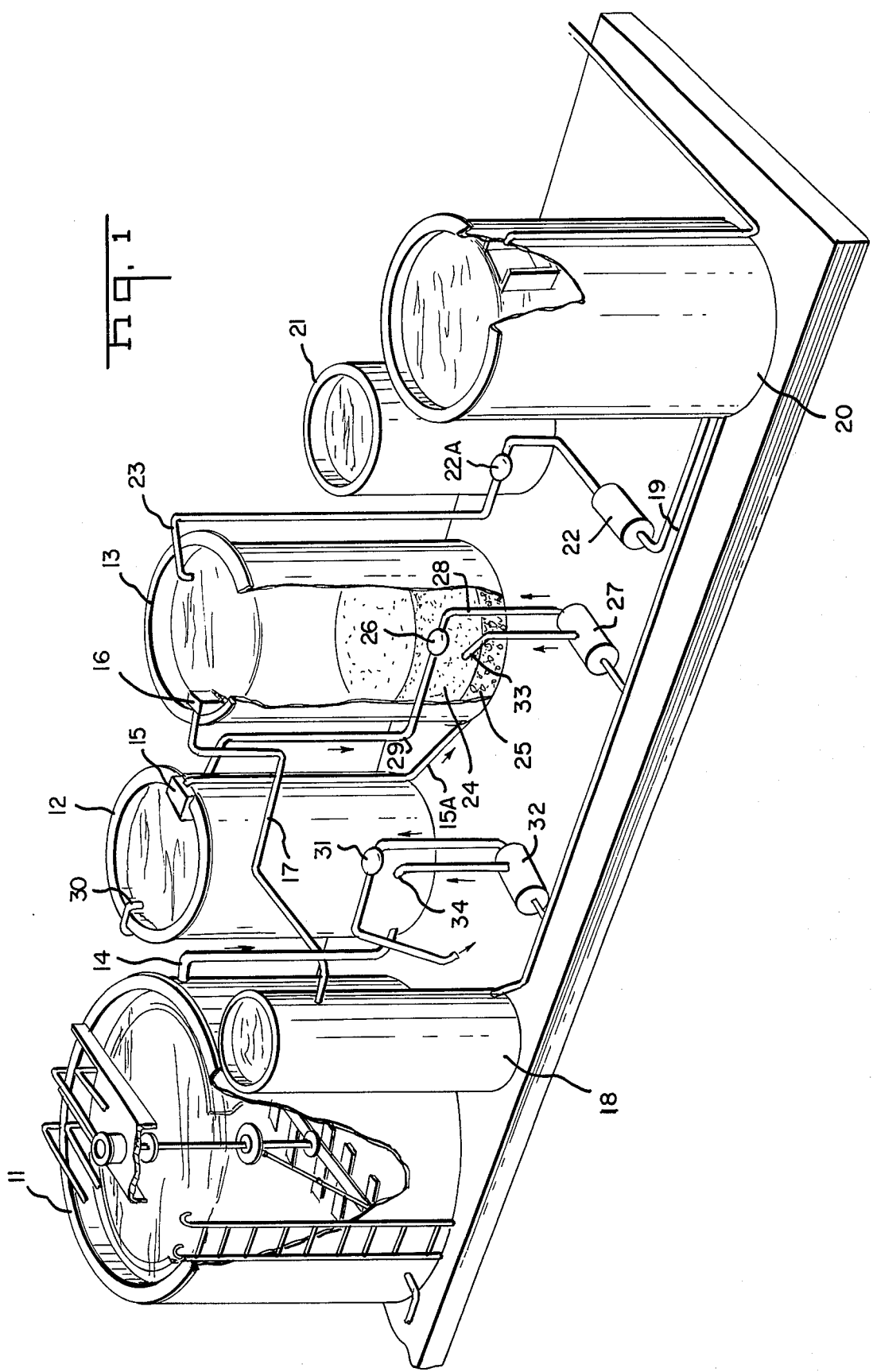
FIG. 1 shows the carbon contact column of this invention in an integrated sewage treatment plant.

FIG. 1 shows a portion of an integrated sewage treatment plant. Not shown are a mix tank and a flocculation tank to which the effluent is initially applied. From the flocculation tank the effluent is supplied to the clarifier 11 which separates flocculated solids from the effluent. The clarified effluent passes upwardly through two carbon contact columns including tanks 12 and 13. The effluent is transferred via the pipe 14 to the bottom of tank 12. Effluent from the top of tank 12 passes through the baffle 15 and pipe 15A to the bottom of tank 13.

Effluent is removed from the top of tank 13 through the baffle 16 and pipe 17 which delivers the effluent to the surge tank 18. A filter pump and a pressure filter have not been shown for clarity of drawing. Rather, the clear liquid from surge tank 18 is shown supplied through pipe 19 to the chlorine contact tank 20 where the clear liquid is disinfected and is now suitable for disposal or, in some instances, reuse.

A carbon makeup tank 21 mixes the carbon and water in a slurry. Pump 22 pumps motive water from tank 20 through jet eductor 22A. The slurry in makeup tank 21 is supplied by jet eductor 22A to the last carbon contact column in the train. In the example shown, the slurry from the carbon makeup tank is supplied by pipe 23 to the top of tank 13. The carbon flows downwardly through the tank in countercurrent contact with the waste water being treated which is flowing upwardly. The carbon forms a bed 24 in the tank. A bed of gravel 25 is provided at the bottom of the tank. Carbon is removed from the bed by the jet eductor 26. Jet eductor 26 has a venturi connected to the tank. A source of motive water flows around the venturi to educe carbon from the tank into the flow of water through the eductor. In the example shown, the stream of motive water is taken from surge tank 18 by the pump 27. The motive water flows through pipe 28 and through the jet eductor 26. The stream of carbon-containing motive water is supplied through pipe 29 to the outlet 30 at the top of tank 12. In this way, carbon is removed from the last tank 13 in the train and supplied to the top of the preceding tank 12. Again, carbon flows downwardly in the tank 12 in counter-current contact with the waste water. It forms a bed at the bottom of tank 12. Carbon is removed from this bed by the jet eductor 31. Again, a stream of motive water is supplied from the surge tank 18 by pump 32. The stream of motive water containing carbon is transferred to waste. Alternatively, if there are other carbon contact columns in the train, the carbon is supplied to the top of a preceding column.

As will be subsequently described, air is sparged through the carbon bed in each column. This air fluidizes and expands the carbon bed and provides air for aeroboic regeneration of the spent carbon. However, as carbon is removed from the bottom of a bed in a flat bottom column, a cavity is produced by the removed carbon which is void of anything but water and fines. The tolerable volume of air being sparged into the carbon bed is not enough to cause a sufficient cave-in of the carbon about this cavity, allowing it to flow out and through the carbon outlet port at a reasonable ratio of carbon to water. In accordance with this invention, this problem is solved by injecting fluidizing water at the point 33 which is adjacent to the jet eductor 26 which removes carbon from the tank 13. This stream of fluidizing water is supplied by the pump 27. Similarly, on tank 12, a source of fluidizing water is supplied at the point 34 which is adjacent to the jet eductor 31. It has been found that by using the fluidizing water injection principle of this invention that it is possible to transport two pounds of carbon per gallon of water out of the carbon contact column. This is contrasted to a comparable tank with no fluidizing water injection in which only a trace of carbon per gallon of water can be transported from the column.

Figure 2:
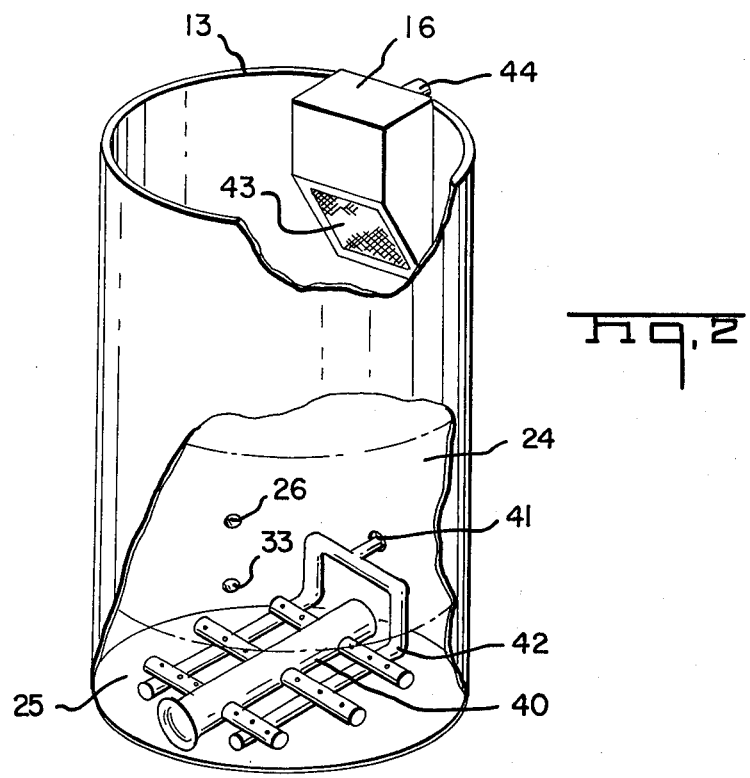
FIG. 2 shows a carbon contact column in more detail.

FIG. 2 shows the carbon contact column in more detail. Incoming waste water is connected to the water distributor 40 which distributes the water uniformly throughout the gravel bed 25. The size, diameter and orifice openings of the water distributor 40 are selected to produce flow of the waste water at a rate of ½ to 3 gpm per square foot of adsorber cross-section. Air is supplied to the air inlet 41. The air inlet 41 is connected to an air distributor 42 which is buried beneath the bed of carbon and within the bed of gravel and below the liquid distributor 40. The size and orifice openings of the air distributor 42 are selected to produce a jetting action of compressed air into the untreated waste water at a rate of 1/10 to 1 scfm per square foot of adsorber cross-section.

As previously discussed, fluidizing water is supplied through the inlet 33 and carbon is removed through the jet eductor 26.

The baffle 16 has a screened baffle outlet 43 which is positioned so that the screen is entirely immersed beneath the normal level of the waste water and below the effluent outlet port 44. The screen mesh is of a size which prevents undue excess of carbon from exiting from the adsorber. The baffle screen is positioned at such an angle with regard to the upward movement of the water and carbon and air flow as to aid in the deflection of granular activated carbon and the passage of water through the screen. The area of screen exposed to the flow of the liquid assures a pressure head differential across the screen no greater than ½ inch of water at a rate of 3 gpm per square foot of adsorber cross-section.

FIG. 3 shows a typical jet eductor in more detail. Fluidizing water is supplied to the inlet 45. It flows around the venturi 46. Carbon from the carbon bed is educed through the port 47 and into the stream of motive water. Motive water carrying carbon exits through the outlet 48.

Figure 4:
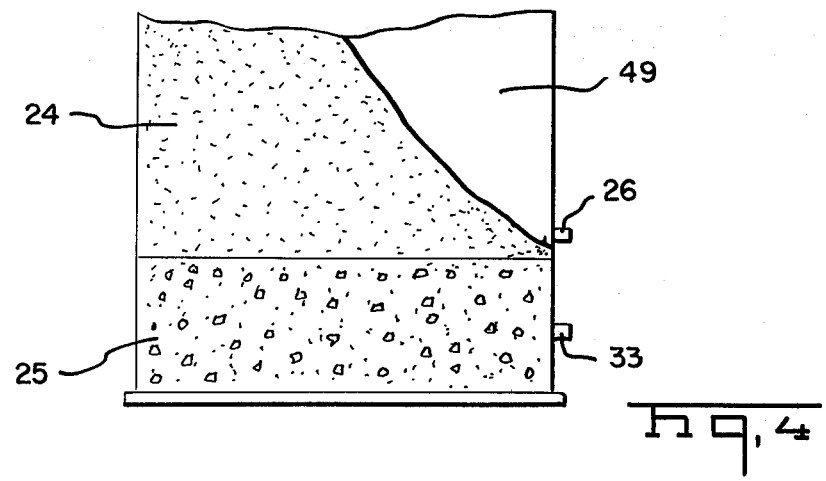
FIG. 4 shows the cavity which may be formed in the carbon bed if the techniques of the present invention are not used.
Figure 7:
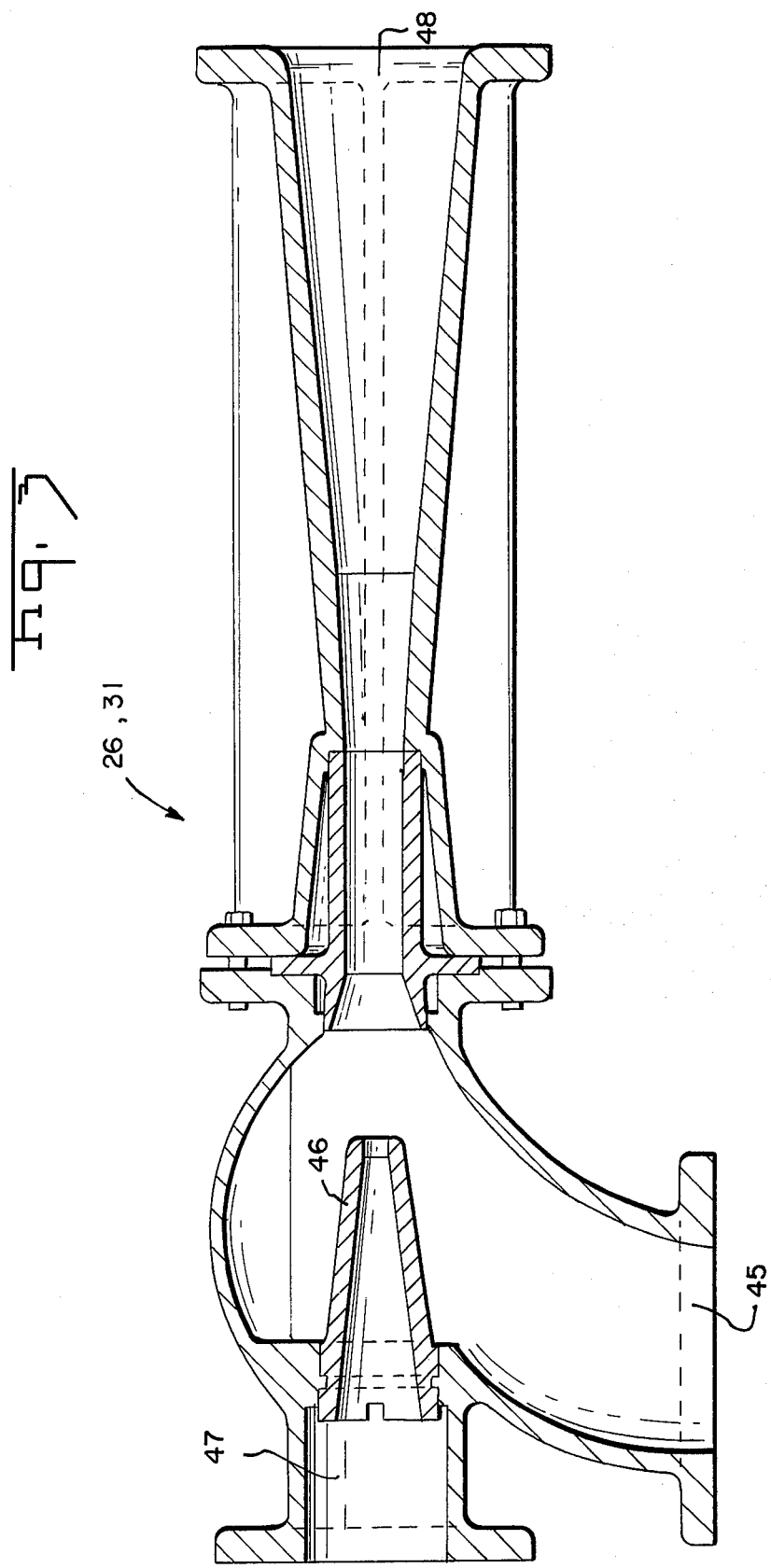

FIG. 4 shows the effect on the carbon if fluidizing water is not supplied. In this case, a cavity 49 develops in the carbon bed. Further transfer of carbon is made difficult. However, supplying fluidizing water at the inlet 33 prevents the formation of the cavity 49 thereby facilitating carbon transfer.

While a particular embodiment of the invention has been shown and described, various modifications may be made without departing from the principles of the invention. Dependent claims are, therefore, intended to cover all such modifications.

What is claimed is:

1. A vertically arranged carbon contact column for a system for removing organic compounds from a waste water stream comprising:
   a tank having a substantially flat bottom enclosing said column,
   means connected to a source of waste water for supplying said waste water stream to the bottom end of said column,
   means connected to a source of carbon for supplying said carbon to the top end of said column, said carbon forming a bed in said column,
   a treated water outlet at the top end of said tank, said waste water flowing through said column in counter-current contact with said carbon,
   means connected to said tank for removing carbon from said bed at the bottom end of said column, and
   an inlet connected to another source of water and connected to but not extending within said tank for supplying fluidizing water to said tank adjacent to said means for removing carbon to prevent the formation of a cavity in said bed.

2. The column recited in claim 1 wherein said means for removing carbon from said bed is a jet eductor system having a venturi connected to said column, a stream of motive water being supplied to said eductor, to flow around said venturi thereby educing carbon from said column into said flow of water through said eductor.

3. The column recited in claim 1 wherein said source of fluidizing water is connected to said column just below said means for removing carbon.

4. The column recited in claim 3 further comprising:
   a liquid collector at the top of said column, and piping connected to said liquid collector for the flow of treated water from the top of said column, said liquid collector having a screen preventing carbon from being removed in said stream of treated water.

5. Apparatus for removing organic compounds from a stream of waste water comprising:

a plurality of tanks having substantially flat bottoms enclosing carbon contact columns mounted on a common base, means for supplying said waste water stream to the bottom end of a first tank, means for removing treated water from the top end of each tank and supplying it to the bottom end of a succeeding tank, means for supplying a source of carbon to the top end of the last succeeding tank, means for removing carbon from each tank and means for supplying it to the top end of a preceding tank, and a source of fluidizing water connected to an inlet in each tank adjacent to the means for removing carbon but not extending within said tanks.

6. The apparatus recited in claim 5 further comprising a carbon makeup tank for mixing carbon and water in a slurry, said slurry being supplied from said carbon makeup tank to said last succeeding contact column.

7. The apparatus recited in claim 5 wherein said means for removing carbon from said bed is a jet eductor system having a venturi connected to said column, a stream of motive water being supplied to said eductor, to flow around said venturi thereby educing carbon from said column into said flow of water through said eductor.

8. The apparatus recited in claim 5 further comprising a surge tank, treated waste water from said last succeeding column being supplied to said surge tank, said surge tank being said source of motive and fluidizing water.

9. The apparatus recited in claim 5 further comprising:

a liquid collector at the top of said column, and piping connected to said liquid collector for the flow of treated water from the top of said column, said liquid collector having a screen preventing carbon from being removed in said stream of treated water.

10. The method of removing organic compounds from a waste water stream comprising:

supplying waste water containing organic compounds through an inlet connected to the bottom end of a carbon contact column having a substantially flat bottom;

supplying carbon to the top end of said column to form a bed of carbon in said column, flowing waste water through said column in counter-contact with said carbon, removing treated water from the top of said column, removing carbon from the bottom of said column, and supplying fluidizing water to said column through another inlet connected to but not extending within said column at a point adjacent to the point where carbon is removed from said column to prevent the formation of a cavity in the carbon bed adjacent the point at which said carbon is removed.

* * * * *